US012305623B2

United States Patent
Maisonneuve

(10) Patent No.: US 12,305,623 B2
(45) Date of Patent: May 20, 2025

(54) SYSTEM AND PROCESS FOR RECOVERING ENERGY FROM GRADIENTS OF GAS MIXTURES

(71) Applicant: Oakland University, Rochester, MI (US)

(72) Inventor: Jonathan Maisonneuve, Auburn Hills, MI (US)

(73) Assignee: Oakland University, Rochester, MI (US)

( * ) Notice: Subject to any disclaimer, the term of this patent is extended or adjusted under 35 U.S.C. 154(b) by 455 days.

(21) Appl. No.: 17/435,193

(22) PCT Filed: Feb. 28, 2020

(86) PCT No.: PCT/US2020/020274
§ 371 (c)(1),
(2) Date: Aug. 31, 2021

(87) PCT Pub. No.: WO2020/180641
PCT Pub. Date: Sep. 10, 2020

(65) Prior Publication Data
US 2022/0145863 A1 May 12, 2022

Related U.S. Application Data

(60) Provisional application No. 62/812,284, filed on Mar. 1, 2019.

(51) Int. Cl.
*F03G 7/00* (2006.01)
*B01D 53/22* (2006.01)

(52) U.S. Cl.
CPC .......... *F03G 7/0252* (2021.08); *B01D 53/22* (2013.01)

(58) Field of Classification Search
CPC .............................. B01D 53/22; F03G 7/0252
See application file for complete search history.

(56) References Cited

U.S. PATENT DOCUMENTS

2007/0186768 A1\* 8/2007 Coors .................. B01D 53/228
95/52
2014/0216046 A1\* 8/2014 Armstrong ................ F02C 3/22
60/752

(Continued)

FOREIGN PATENT DOCUMENTS

| CN | 108667346 A | \* 10/2018 | .......... H01G 9/2031 |
| EP | 2708275 B1 | 2/2017 | |
| WO | 19/027969 A1 | 2/2019 | |

OTHER PUBLICATIONS

Gellender, A proposed new energy source: The "mixing energy" of engine exhaust gas, Journal of Renewable and Sustainable Energy, vol. 2, Mar. 9, 2010 [retrieved on Apr. 15, 2020]. Retrieved from the Internet: <URL: https:/laip.scitation.org/doi/pdf/10.1063/1.3324789>. entire document.

(Continued)

*Primary Examiner* — Robert A Hopkins
(74) *Attorney, Agent, or Firm* — Fishman Stewart PLLC

(57) ABSTRACT

A gradient energy system includes a membrane module including a first section, a second section, and a membrane separating the first section and the second section. A first gas may be provided within the first section. A second gas may be provided within the second section. The membrane module may be configured such that a differential associated with the first gas and the second gas generates a fluid pressure force or an electrical current. A method of recovering energy from gradients of gas mixtures may include providing a first gas to a first section of a membrane module, providing a second gas to a second section of the membrane module, which may be separated from the first section by a (Continued)

membrane, and/or recovering energy generated via a differential between the first gas and the second gas.

20 Claims, 12 Drawing Sheets

(56) References Cited

U.S. PATENT DOCUMENTS

2018/0053953 A1   2/2018   Eickhoff et al.
2021/0028523 A1   1/2021   Qi et al.

OTHER PUBLICATIONS

Hamelers et al., Harvesting energy from C02 emissions, Environmental Science and Technology Letters, vol. 1, Jul. 23, 2013 [retrieved on Apr. 17, 2020). Retrieved from the Internet: <URL: https:/lpubs.acs.org/doi/pdf/l0.l021/ez4000059>. pp. 31-35.
International Search Report, PCT/US2020/020274, dated May 19, 2020.

\* cited by examiner

SYSTEM AND PROCESS FOR RECOVERING ENERGY FROM GRADIENTS OF GAS MIXTURES

CROSS-REFERENCE TO RELATED APPLICATION

This application is a National Stage Patent Application of International Patent Application No. PCT/US2020/020274, filed Feb. 28, 2020, which claims the benefit of U.S. Provisional Patent Application Ser. No. 62/812,284, filed on Mar. 1, 2019, the disclosures of which are hereby incorporated by reference in their entirety as though fully set forth herein.

TECHNICAL FIELD

The present disclosure generally relates to energy systems, and a system and process for recovering energy from gradients of gas mixtures.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

The mixing of gas mixtures with different compositions may release energy (known as Gibbs free energy of mixing). Gibbs free energy generally describes the reversible energy that may be released with the mixing of gases with different compositions. The following may be a relevant equation:

$$-\Delta G = G_m - G_i = RT \left\{ \left[ \Sigma \frac{p_i}{P_{atm}} \ln \frac{p_i}{P_{atm}} \right]_M - \phi_A \Sigma \left[ \frac{p_i}{P_{atm}} \ln \frac{p_i}{P_{atm}} \right]_A - \phi_B \Sigma \left[ \frac{p_i}{P_{atm}} \ln \frac{p_i}{P_{atm}} \right]_B \right\}$$

For example, at room temperature, up to 3.1 J/l of energy may be released when humid air is mixed with dry air. Gas mixture gradients may exist, for example, in manufacturing and power plant exhaust, vehicle exhaust, building exhaust, as well as biological sources, where typically water vapor and carbon dioxide may be mixed with atmosphere of mostly nitrogen and oxygen. This means that in various processes, there exists an energy source which is yet untapped.

There is a desire for solutions/options that minimize or eliminate one or more challenges or shortcomings of energy systems. The foregoing discussion is intended only to illustrate examples of the present field and is not a disavowal of scope.

SUMMARY

In embodiments, a gradient energy system may include a membrane module including a first section, a second section, and a membrane separating the first section and the second section. A first gas may be provided within the first section. A second gas may be provided within the second section. The membrane module may be configured such that a differential associated with the first gas and the second gas generates a fluid pressure force or an electrical current.

With embodiments, a method of recovering energy from gradients of gas mixtures may include providing a first gas to a first section of a membrane module, providing a second gas to a second section of the membrane module, which may be separated from the first section by a membrane, and/or recovering energy generated via a differential between the first gas and the second gas.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

With embodiments, an energy system 10 may be configured for converting the potential from various gases (e.g., a first gas 12 and a second gas 14) to mechanical work and/or electrical current/power. Additionally or alternatively, an energy system 10 may be configured for capturing water vapor energy.

Figure 1:
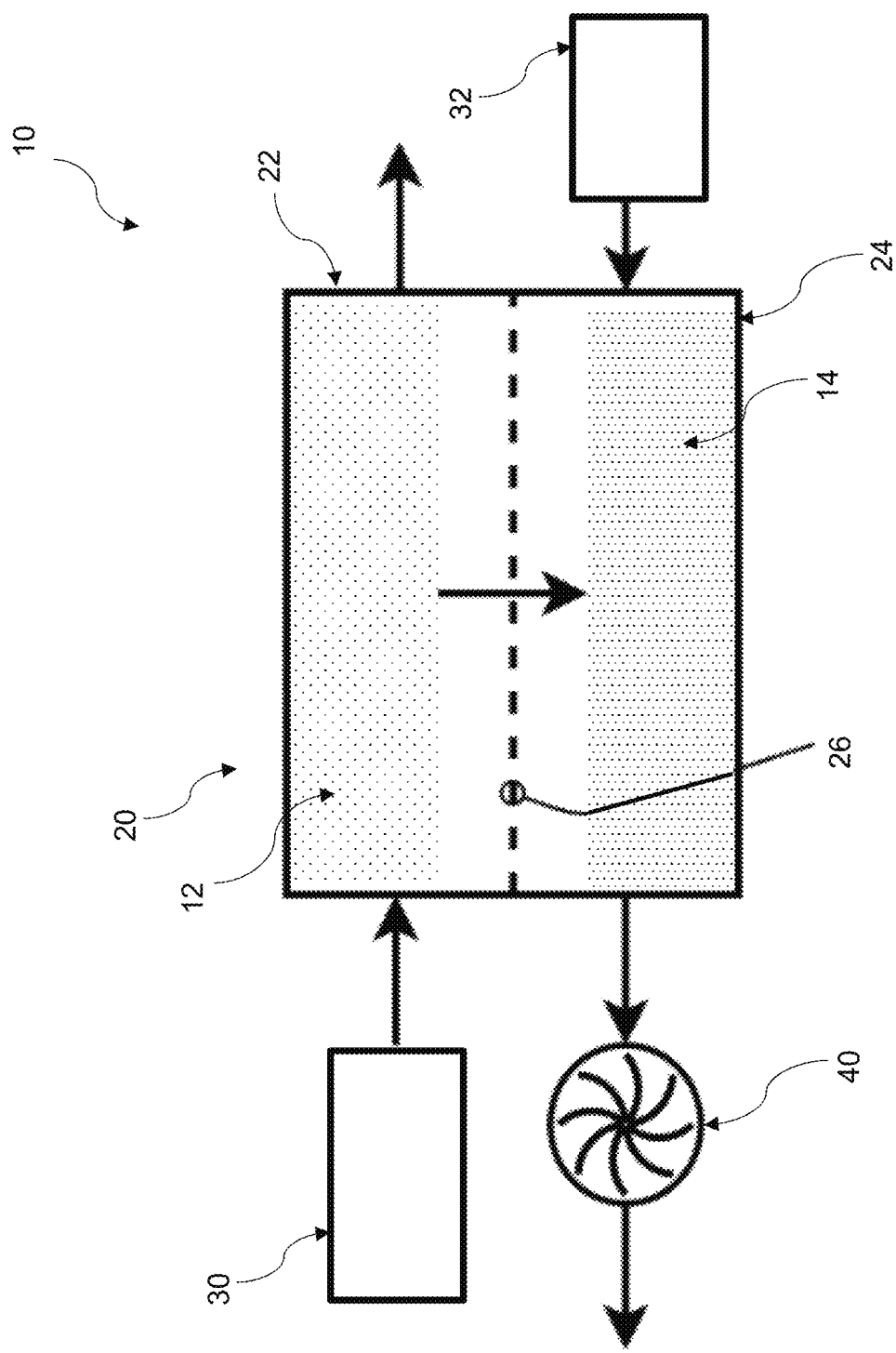
FIG. 1 is a schematic generally illustrating an embodiment of an energy system according to teachings of the present disclosure.

In embodiments, such as generally illustrated in FIG. 1, an energy system 10 may include a membrane module 20. The membrane module 20 may include a first section/chamber 22, a second section/chamber 24, and/or a membrane 26 that may at least partially separate the first section 22 from the second section 24. A first gas source 30 may be connected to the first section 22 and may be configured to provide a first gas 12 to the first section 22. The first gas source 30 may, for example and without limitation, include an exhaust conduit, such as of a machine or facility that may exhaust a first gas 12 that may include water vapor and/or carbon dioxide. A second gas source 32 may be connected to the second section 24 and may be configured to provide a second gas 14 to the second section 24. The second gas source 32 may, for example and without limitation, include ambient air and/or an air mover (e.g., a fan/pump) configured to move ambient air to (and/or compress gas in) the second section 24. A load 40 (e.g., a mechanical load, such as a turbine) may be connected to an output of the second section 24.

With embodiments, a membrane 26 may be configured as a vapor permeable membrane. The membrane 26 may be utilized, for example, to separate a first gas 12, such as a humid air stream, that may be provided in or through the first section 22 from a second gas 14, such as compressed dry sweep gas, that may be provided in or through the second section 24. A partial pressure difference between the first gas 12 and the second gas 14 may cause some of the first gas 12 (e.g., water vapor) to permeate from the first section 22 through the membrane 26 to the second section 24. Permeation of the first gas 12 into the second section 24 may increase the volume of gas in the second section 24, which may have a substantially fixed volume. Such an increase in gas volume in the second section 24 may increase the pressure of the gas in the second section 24 such that the second section 24 may be configured to provide pressurized gas. Pressurized gas may provide a fluid pressure force and/or may perform work (e.g., on a load 40), which may effectively recover/capture/convert energy of the gases. For example, in an embodiment in which the first gas 12 includes water vapor, water vapor may permeate across the membrane 26, which may increase the gas pressure in the second section 24, and gas pressurized in the second section 24 may do work on a load 40. However, the present disclosure is not limited to water vapor gradients, and other gases and gas mixtures may be used.

Figure 2A:
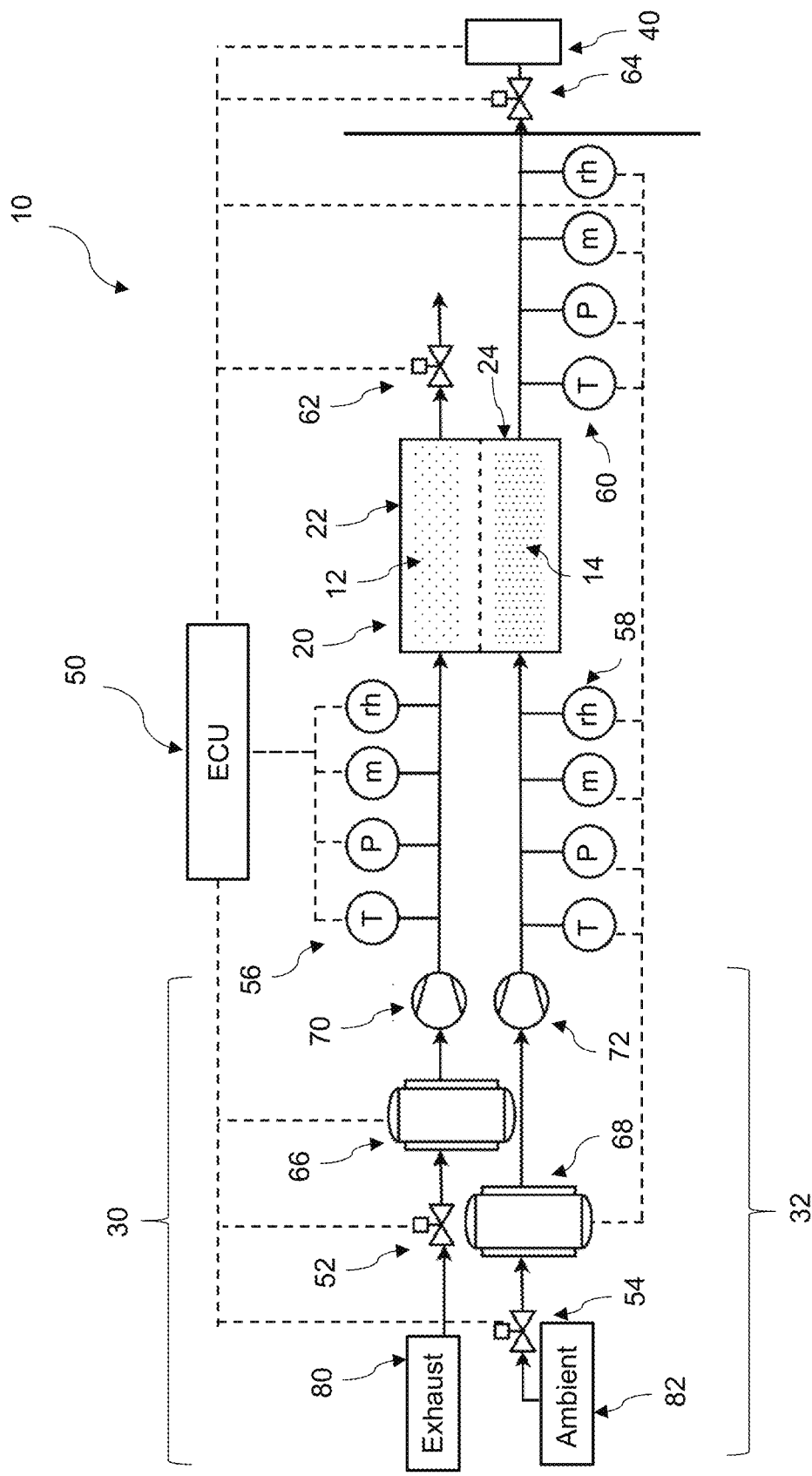
FIG. 2A is a schematic generally illustrating an embodiment of an energy system involving teachings of the present disclosure.

With embodiments, such as generally illustrated in FIG. 2A, an energy system 10 may include an electronic control unit (ECU) 50 that may be configured to communicate and/or control one or more portions of the system 10. For example and without limitation, the ECU 50 may be configured to communicate with and/or control the first gas source 30, the second gas source 32, one or more flow control valves 52, 54, one or more sensors 56, 58, 60, a first outlet valve 62, a second outlet valve 64, a first humidifier 66, a second humidifier 68, a first pump 70, a second pump 72, and/or a load 40. The ECU 50 may be configured to communicate and/or control one or more portions of the system 10, such as to optimize the energy generated and/or captured by the system 10.

FIG. 2A generally illustrates an embodiment of an energy system 10. The first gas source 30 may include a flow control valve 52 that may be connected to an exhaust 80, may include a humidifier 66, and/or may include a pump 74. The flow control valve 52, humidifier 66, and/or pump 70 may control the pressure, humidity, and/or flow rate of the first gas 12 that may be provided to the first section 22 of the membrane module 20. The second gas source 32 may include a flow control valve 54 that may be connected to ambient air 82, may include a humidifier 68, and/or may include a pump 72. The flow control valve 54, humidifier 68, and/or pump 72 may control the pressure, humidity, and/or flow rate of the second gas 14 that may be provided to the second section 24. One or more sensors 56, 58, 60 (e.g., a temperature sensor (T), a pressure sensor (P), a flow sensor (m), and/or a humidity sensor (rh)) may be connected at the inlet of the first section, the inlet of the second section, and/or the outlet of the second section. A first outlet valve 62 (e.g., a backpressure valve) may be connected to the outlet of the first section 22. A second outlet valve 64 may be connected to the outlet of the second section 24, such as downstream of the sensors 60 and/or upstream of a load 40 that may be connected to the outlet of the second section 24.

With embodiments, an energy system 10 may be tested and/or calibrated, which may include utilizing a common gas (e.g., from a gas container) for the first gas 12 and the second gas 14, and adjusting the fluid pressure, humidity, temperature, and/or flow rate of at least some of the gas to provide a differential between the first gas 12 and second gas 14 provided to the membrane module 20. In some embodiments, such as if the system 10 is not being tested or calibrated, one or more components shown in FIG. 2A may be omitted. In some embodiments, the ECU 50 may be configured to control, at least in part, the first gas source 30 and/or the second gas source 32, such as to modify the exhaust 80 and/or ambient air 82 to optimize energy recovery (e.g., if energy for the adjustments is exceeded by an increase in expected energy recovery).

Figure 2B:
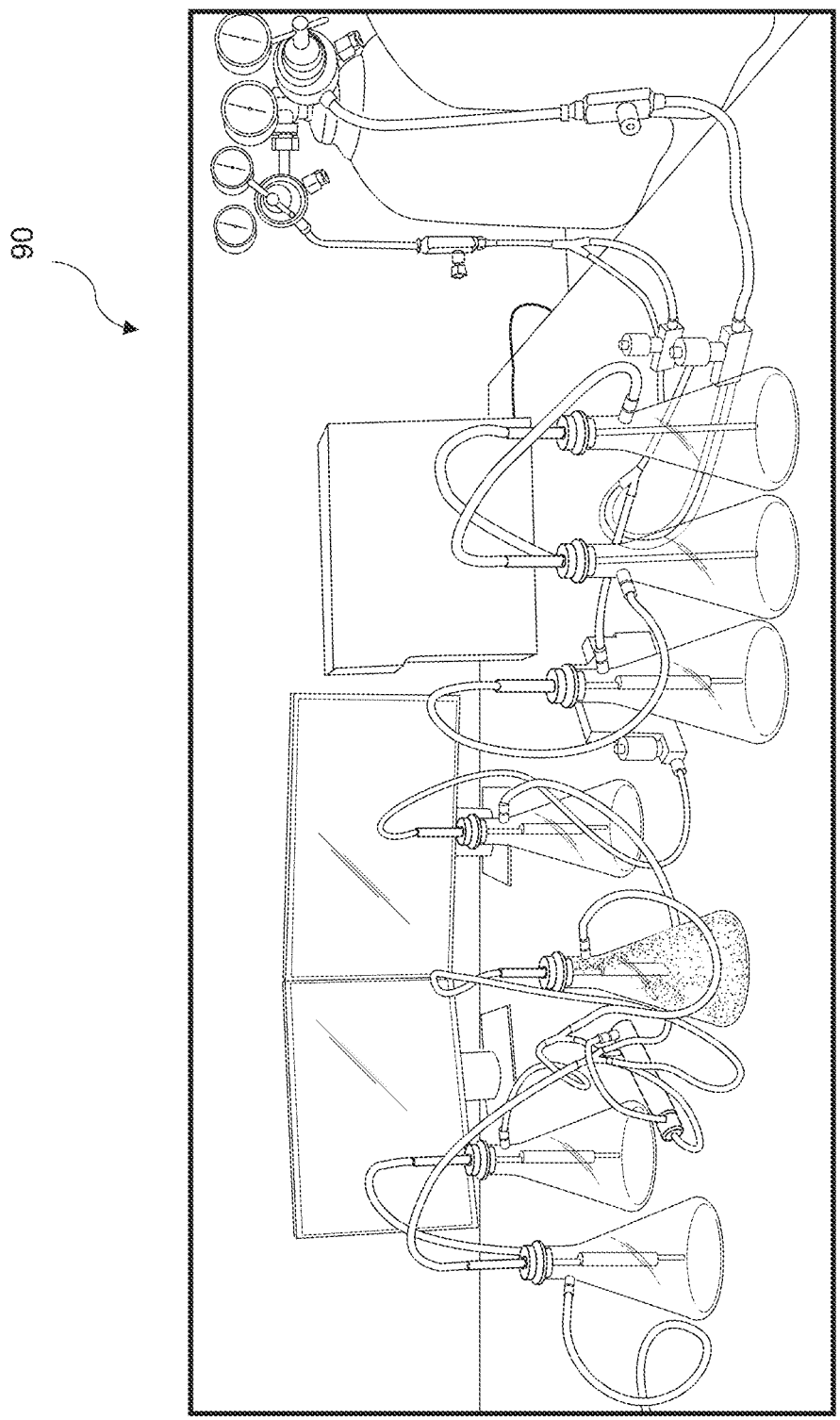
FIG. 2B is a photograph generally illustrating an embodiment of a laboratory bench unit involving teachings of the present disclosure.

FIG. 2B is a photograph that generally illustrates an embodiment of a laboratory bench unit 90 that may be suitable for testing embodiments of energy systems 10 of the present disclosure.

Figure 3A:
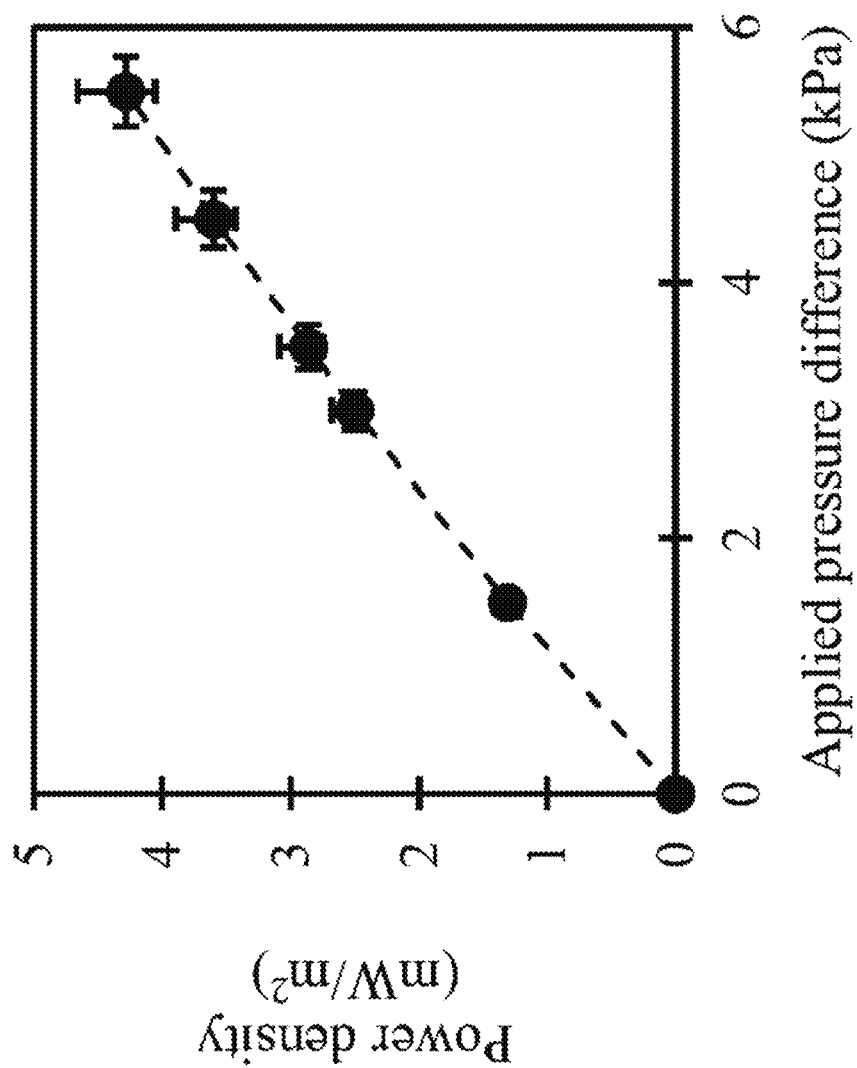
FIG. 3A is a graph generally illustrating power density as a function of applied pressure given water vapor gradients of 18 g/kg at room temperature for an embodiment of an energy system according to teachings of the present disclosure.
Figure 3B:
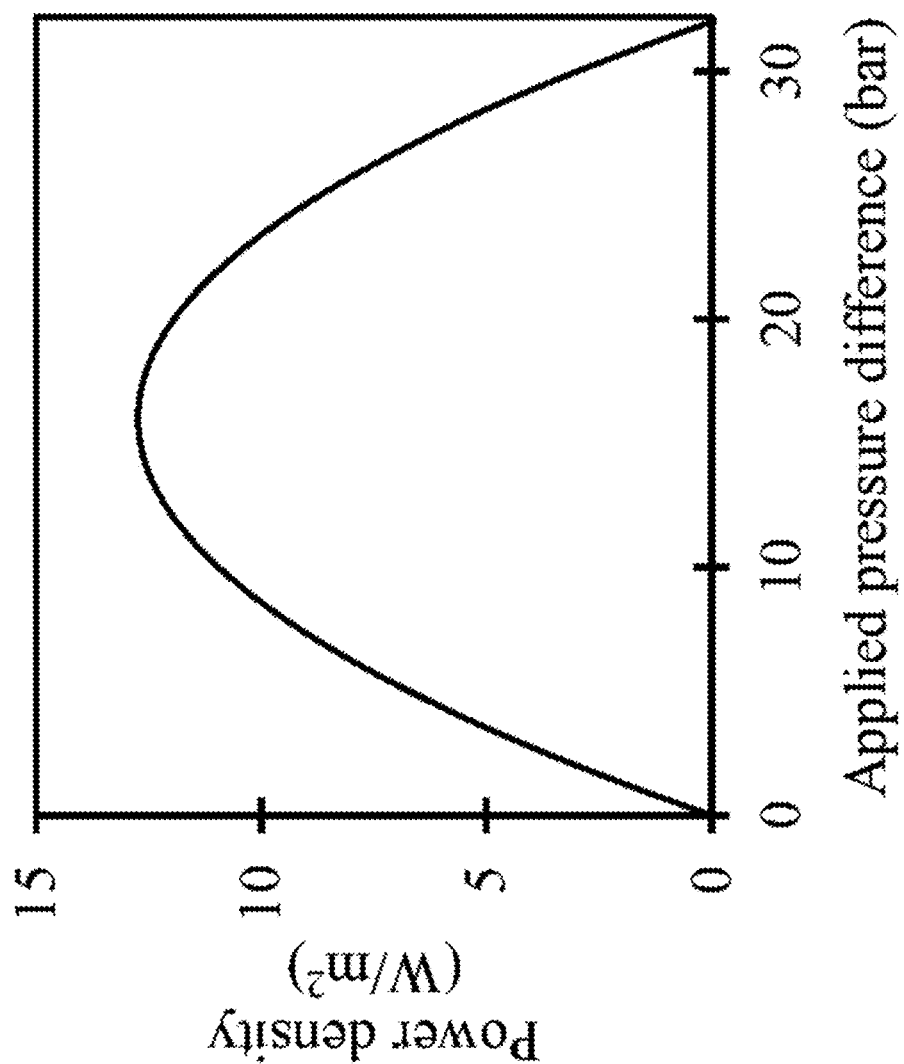
FIG. 3B is a graph generally illustrating power density as a function of applied pressure given water vapor gradients of 18 g/kg at room temperature for an embodiment of an energy system according to teachings of the present disclosure.

FIGS. 3B and 3B generally illustrate power densities that may be associated with embodiments of energy systems 10 of the present disclosure. With respect to FIG. 3B, for example and without limitation, under room temperature conditions, power densities of near or close to 15 $W/m^2$ may be obtained. Power densities may be generated using membrane materials generally available in a laboratory. However, membranes 26 may be provided with characteristics that may further improve power density results. Moreover, higher power densities may be obtained from larger gradients that may be available at higher temperatures, and/or from other gases (including, without limitation, carbon dioxide and/or other industrial or commercial exhaust gases).

Figure 4:
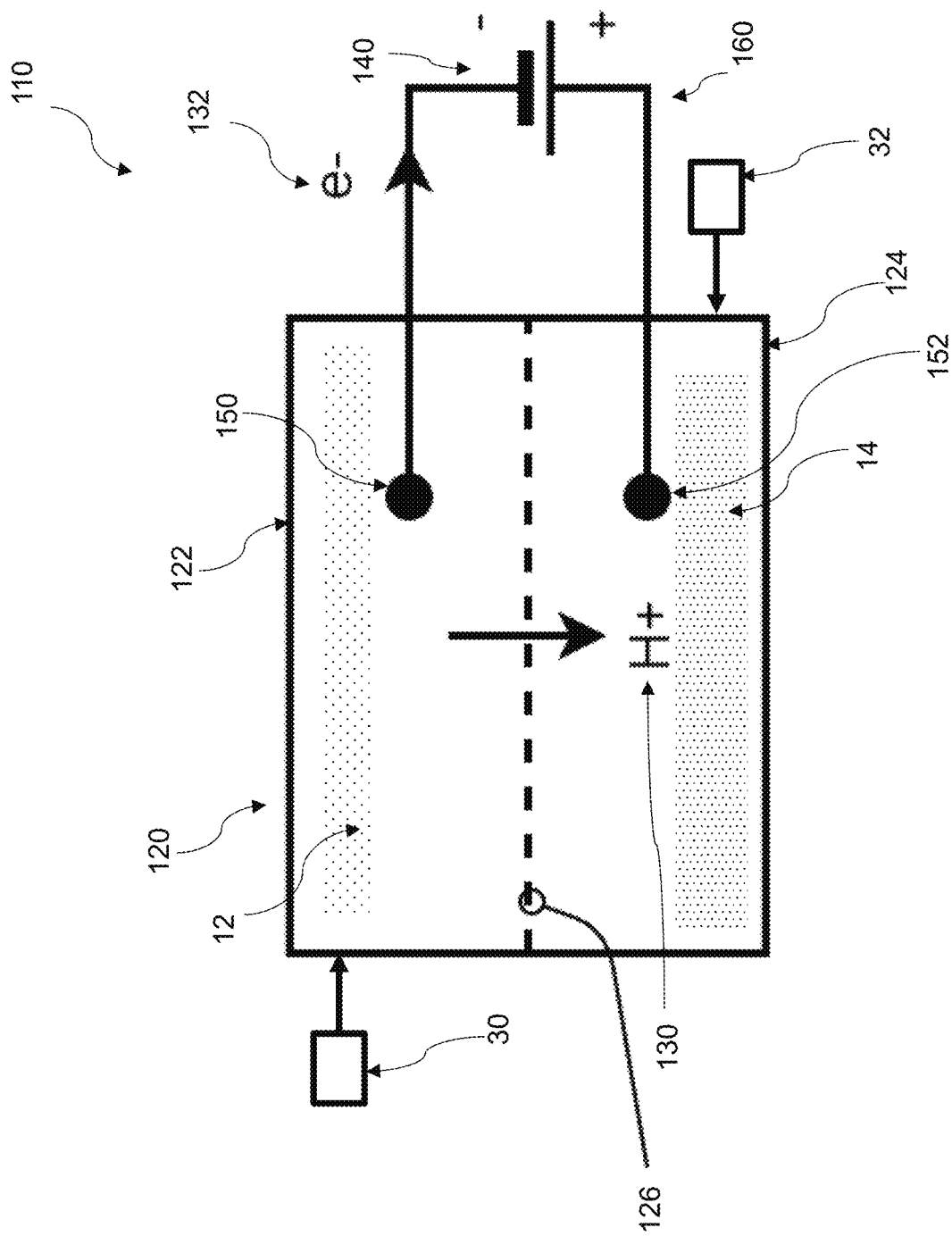
FIG. 4 is a schematic generally illustrating an embodiment of an energy system according to teachings of the present disclosure.

FIG. 4 generally illustrates an embodiment of an energy system 110 that may be configured for conversion of gas gradients. For example and without limitation, the energy system 100 may be configured for conversion of humidity gradients to electricity, such as via reverse electrolysis, which may, for example, include introducing a first gas (e.g., humid air) and a second gas (e.g., dry air) into chambers 122, 124 separated by a membrane 126 in a membrane module 120.

In embodiments, an energy system 110 may include a membrane module 120 that may include a first section/chamber 122, a second section/chamber 124, and/or a membrane 126 that may at least partially separate the first section 122 and the second section 124. The membrane 126 may include a proton exchange membrane that may facilitate movement of protons 130 from the first section 122 to the second section 124 (e.g., provide a high permeability to protons 130), and/or may restrict movement of electrons 132 and/or a first gas 12 (e.g., water vapor) from the first section 122 to the second section 124 (e.g., may provide selectivity for electrons 132 and/or the first gas 12/water vapor).

With embodiments, a first electrode 150 (e.g., an anode) may be disposed at least partially in the first section 122 of the membrane module 120, and/or a second electrode 152 (e.g., a cathode) may be disposed at least partially in the second section 124 of the membrane module 120. The first section 122 may, for example, serve as an anode chamber/section. The second section 124 may, for example, serve as a cathode chamber/section. The first electrode 150 and/or the second electrode 152 may be connected to a circuit 160 (e.g., an external circuit) that may include a load 140 (e.g., an electrical load, such as an energy storage device/battery, an electrical actuator, an electronic device, etc.).

In embodiments, a first gas 12 may be provided to the first section 122 and/or a second gas 14 may be provided to the second section 124. The first gas 12 may, for example and without limitation, include water vapor. The second gas 14 may be drier (e.g., include less water vapor) than the first gas 12. Under such conditions, water vapor in the first gas 12 in the first section 122 may undergo hydrolysis, which may include water vapor (e.g., H$_2$O) decomposing into oxygen (O$_2$), a hydrogen proton (H+) 130, and/or a free electron (e−) 132. Hydrogen protons 130 may permeate across the membrane 126, while free electrons 132 may move/be conducted (e.g., via the first electrode 150) to a circuit 160 that may be connected (e.g., electrically) to the first electrode 150 and/or the second electrode 152. Electrons 132 moving (e.g., electrical current) to the circuit 160 may power the load 140. Hydrogen protons 130 (e.g., originally from the first gas 12 in the first section 122) and electrons 132 (e.g., from the circuit 160, originally from the first gas 12 in the first section 122) may be received in the second section 124, and may then react with oxygen (e.g., of the second gas 14) in the second section 124 to form water (H$_2$O).

Without limitation, FIGS. 5A-7B generally illustrate example test results for given embodiments of the present disclosure. Among other things, such results demonstrate an increase of power density by increasing the gradient potential, increasing the crossflow rate, and/or configuring the flow of the first gas 12 (e.g., a feed stream) and the flow of the second gas 14 (e.g., a sweep stream) in a counter flow arrangement (see, e.g., the counter flow arrangement of FIG. 1).

Figure 5A:
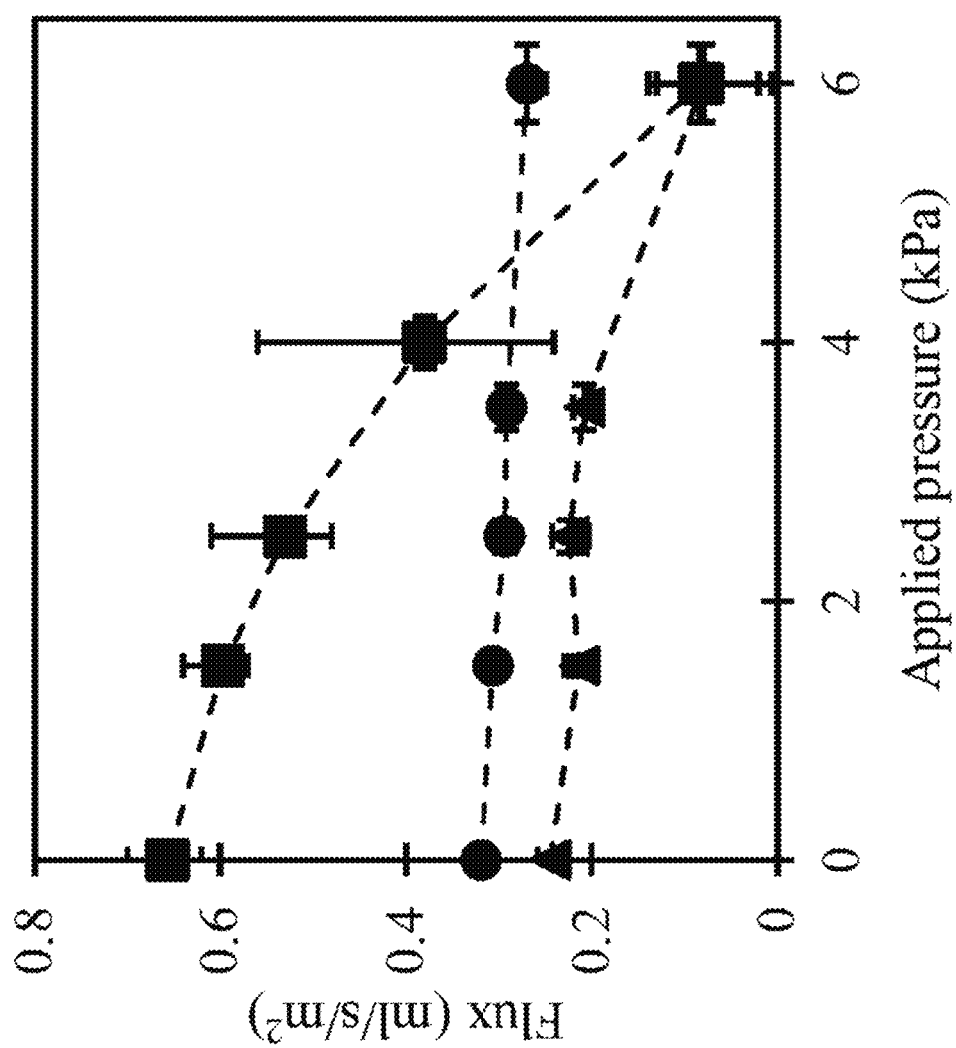
FIGS. 5A and 5B are graphs generally illustrating water vapor flux and power density, respectively, relative to applied pressure for an embodiment of an energy system during compressed air expansion at room temperature using various humidity gradients according to teachings of the present disclosure.
Figure 5B:
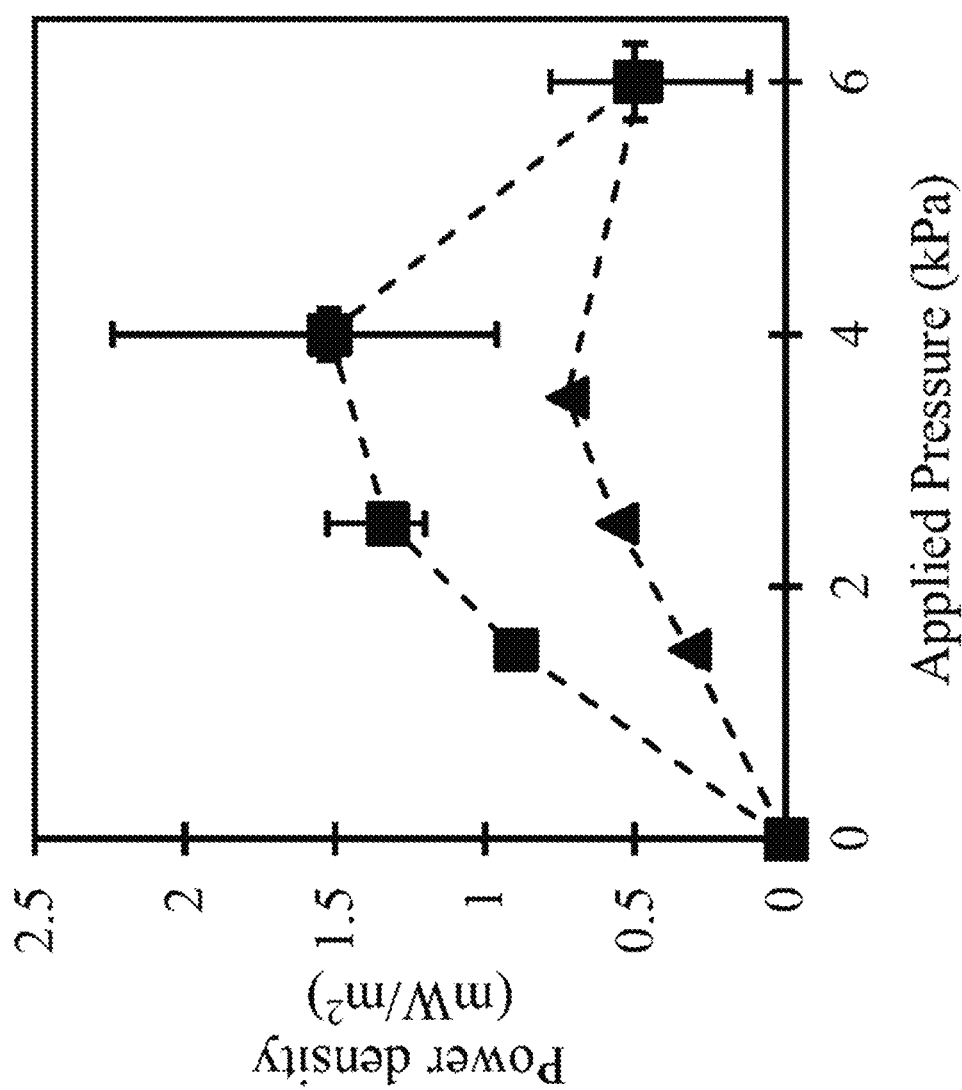

FIGS. 5A and 5B are graphs generally illustrating an embodiment of water vapor flux and power density obtained during compressed air expansion at room temperature using various humidity gradients according to teachings of the present disclosure.

Figure 6A:
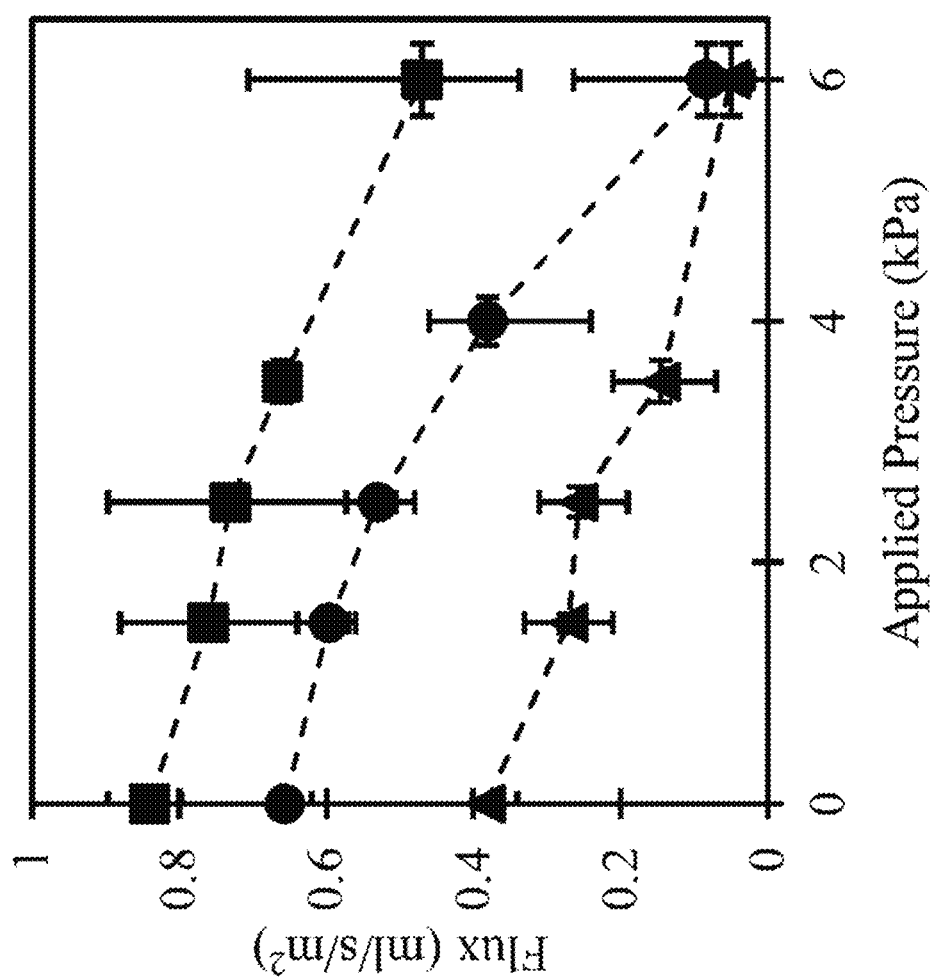
FIGS. 6A and 6B are graphs generally illustrating water vapor flux and power density, respectively, relative to applied pressure for an embodiment of an energy system obtained during compressed air expansion at room temperature using various supply flow rates according to teachings of the present disclosure.
Figure 6B:
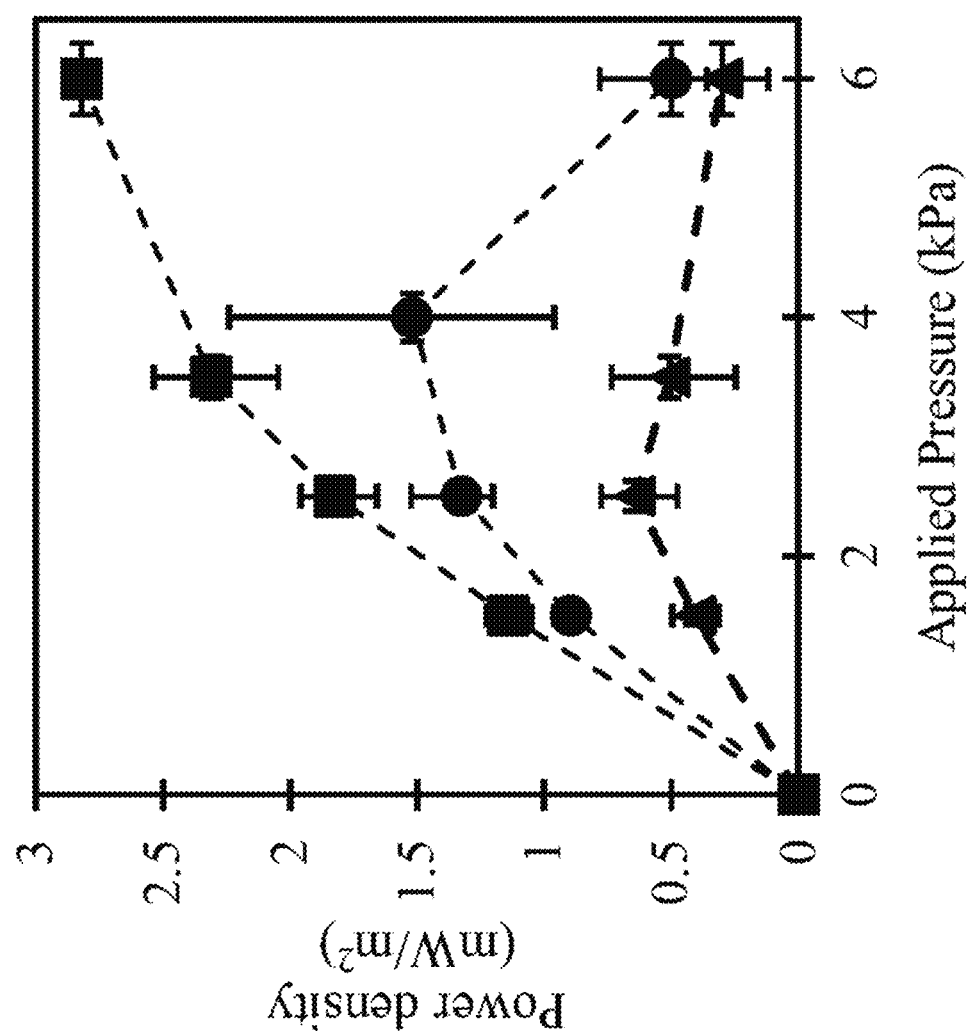

FIGS. 6A and 6B are graphs generally illustrating an embodiment of water vapor flux and power density obtained during compressed air expansion at room temperature using various supply flow rates according to teachings of the present disclosure.

Figure 7A:
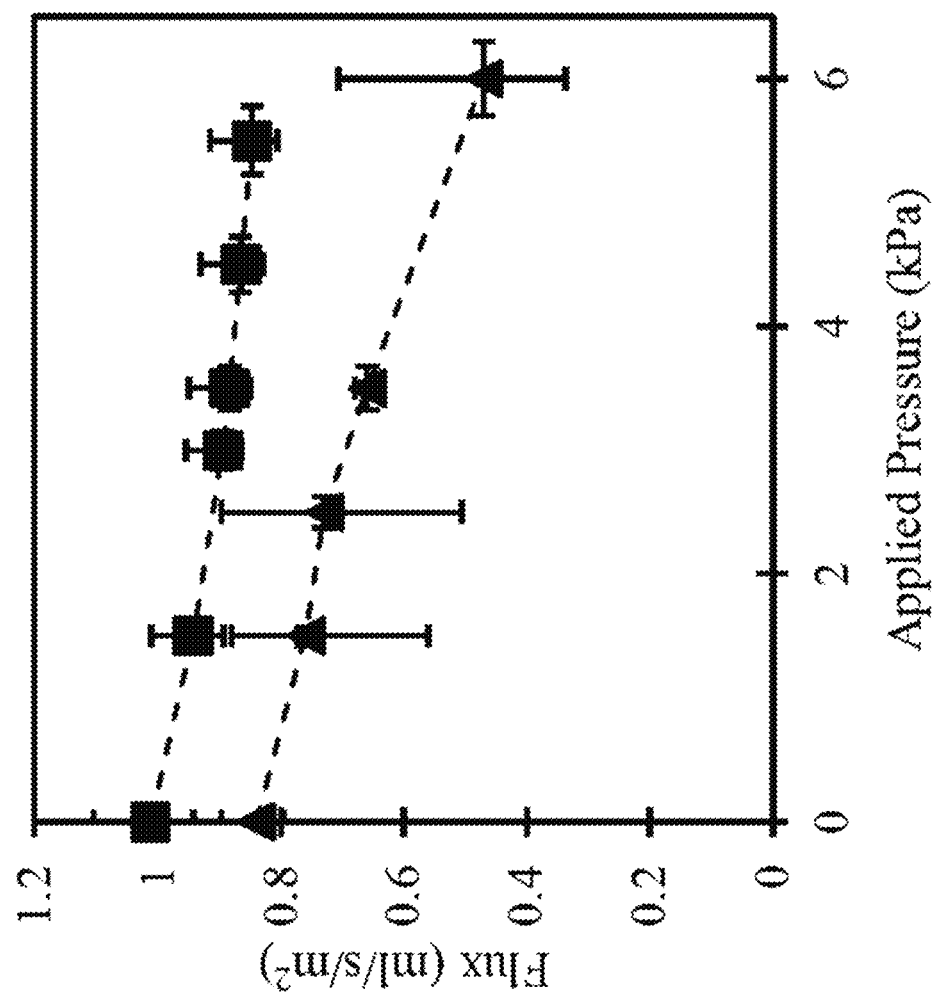
FIGS. 7A and 7B are graphs generally illustrating water vapor flux and power density, respectively, relative to applied pressure for an embodiment of an energy system obtained during compressed air expansion at room temperature using parallel and counter-flow configurations in a membrane according to teachings of the present disclosure.
Figure 7B:
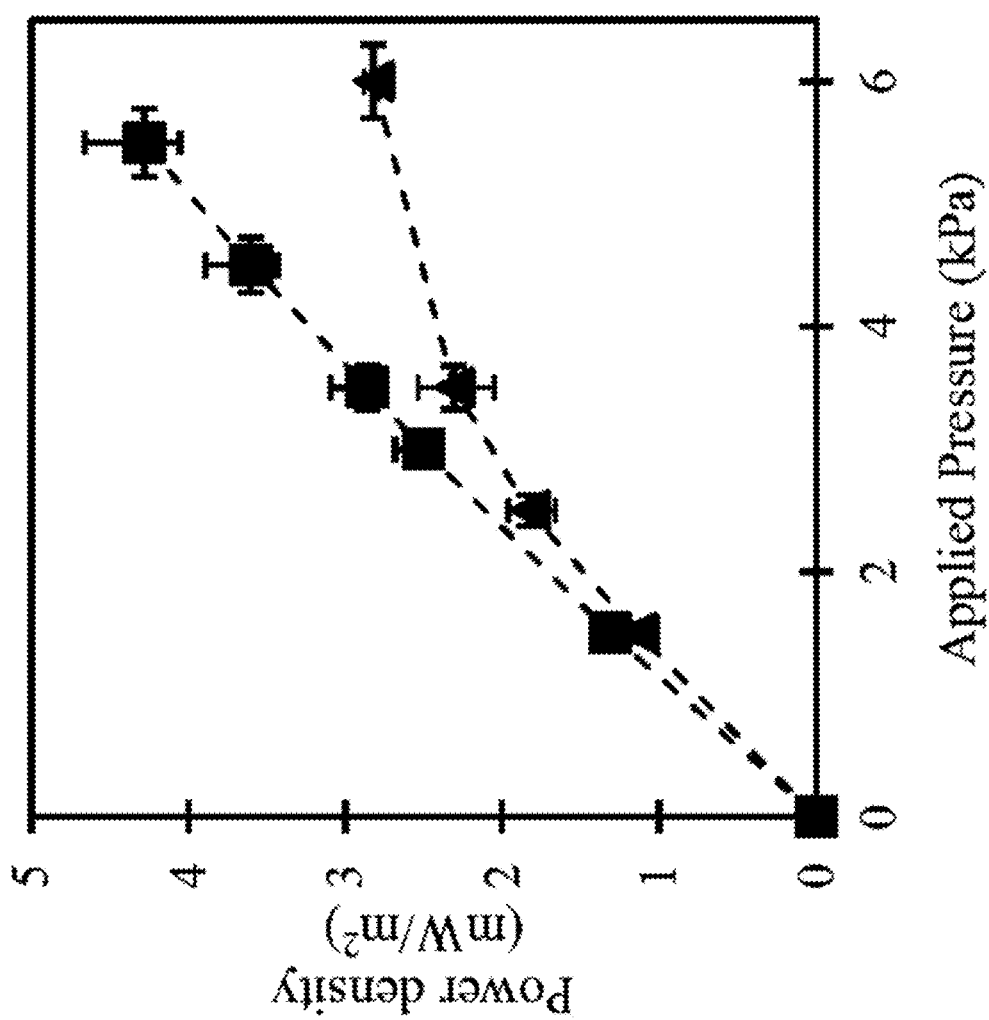

FIGS. 7A and 7B are graphs generally illustrating an embodiment of water vapor flux and power density obtained during compressed air expansion at room temperature using parallel and counter-flow configurations in the membrane according to teachings of the present disclosure.

With reference to vapor flux and power densities, including the data associated with FIGS. 5A-7B, it is noted that vapor permeate flux across a membrane 26 may be driven by the partial pressure difference of the gases 12, 14 in the mixture, which may be a function of a pressure applied by a load 40. The following equation may be relevant:

$$J = \frac{k}{\delta} \Delta p_{H_2O}$$

Permeability is a material property (e.g., of the membrane 26) that may correspond to the ability of the material to transmit certain fluids, and with respect to the membrane 26 in some embodiments, may describe the ability of the membrane 26 to transmit vapor (e.g., H$_2$O vapor) from a first side of the membrane 26 (e.g., in the first section 22) to a second side of the membrane 26 (e.g., in the second section 24). Selectivity describes the tendency of a material (e.g., of the membrane 26) to block certain gases including, for example and without limitation, N$_2$ and O$_2$. Power from compressed air humidification may be given by the product of permeate flux and the applied pressure.

Embodiments of the present disclosure may be included in a variety or systems or devices. By way of example and without limitation, embodiments of the present disclosure may be connected and/or integrated with or into: (i) water-cooled thermal power plants, for instance, to recover energy from saturated flue gases; (ii) building or greenhouse ventilation systems for energy recovery from humid exhaust air; (iii) energy recovery from humidity gradients in controlled human and plant environments (e.g., aboard a space shuttle); (iv) biomedical applications associated with living organisms (e.g., for energy harvesting from breath, for example, to power sensors and other biomedical devices); and/or (v) various closed-loop cycles for energy storage applications.

In examples, an ECU (e.g., ECU 50) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A gradient energy system, comprising:
    a membrane module including:
        a first section;
        a second section connected to a mechanical load, the second section having a substantially fixed volume; and
        a membrane separating the first section and the second section;
    a first gas provided within the first section; and
    a second gas provided within the second section;
    wherein a partial pressure difference between the first gas and the second gas causes at least some of the first gas to passively or spontaneously permeate from the first section to the second section to join the second gas and to increase a volume of gas in the second section; the increased volume of gas in the second section generates a pressurized force in the second section; and the pressurized force in the second section is transferred to perform mechanical work on or in connection with the mechanical load.

2. The gradient energy system of claim 1, wherein the first gas comprises a humid air stream and the second gas comprises a dry sweep gas, and the partial pressure difference drives water vapor across the membrane.

3. The gradient energy system of claim 1, wherein the load includes a turbine.

4. The gradient energy system of claim 1, wherein the first gas includes air containing water vapor.

5. The gradient energy system of claim 4, wherein the second gas includes less water vapor than the first gas.

6. The gradient energy system of claim 5, wherein the second gas includes dry compressed air.

7. The gradient energy system of claim 1, wherein the membrane is vapor permeable.

8. A method of recovering energy from gradients of gas mixtures, the method comprising:
    providing a gradient energy system as recited in claim 1;

providing the first gas to the first section of the membrane module;

providing the second gas to the second section of the membrane module, the second section separated from the first section by the membrane; and recovering energy generated via the differential between the first gas and the second gas.

9. The method of claim 8, including increasing a pressure in the second section of the membrane module via water vapor of the first gas in the first section permeating to the second section; and wherein recovering the energy includes providing pressurized gas or fluid from the second section to the load.

10. The method of claim 8, wherein the first gas is an exhaust gas from a machine or a facility.

11. The method of claim 8, wherein providing the first gas to the first section includes providing the first gas to the first section via a first fluid pump; and/or wherein providing the second gas to the second section includes providing the second gas to the second section via a second fluid pump.

12. The method of claim 10, wherein the first gas includes water vapor and carbon dioxide.

13. The gradient energy system of claim 1, wherein the load comprises a mechanical device.

14. The gradient energy system of claim 2, wherein the first gas includes water vapor.

15. The gradient energy system of claim 2, wherein the second gas includes a lower concentration of water vapor than the first gas.

16. The gradient energy system of claim 2, wherein the membrane is selectively permeable to the first gas.

17. The gradient energy system of claim 1, wherein a first gas source is connected to the first section to provide the first gas.

18. The gradient energy system of claim 17, wherein the first gas source includes an exhaust conduit from a machine or facility.

19. The gradient energy system of claim 1, wherein a second gas source is connected as an input to the second section and provides the second gas.

20. The gradient energy system of claim 19, wherein the second gas include ambient air or a compressed gas.

* * * * *